United States Patent [19]
Goodson et al.

[11] Patent Number: 5,325,729
[45] Date of Patent: Jul. 5, 1994

[54] GAS TURBINE METER

[75] Inventors: Franklin D. Goodson, Katy; Zaki D. Husain; Helmut Zenger, all of Houston; Bob E. Kubin, Spring; Charles Allen, Houston; Jack Harshman, Missouri, all of Tex.

[73] Assignee: Daniel Industries, Inc., Houston, Tex.

[21] Appl. No.: 834,601

[22] Filed: Feb. 12, 1992

[51] Int. Cl.$^5$ .............................................. G01F 1/115
[52] U.S. Cl. .............................. 73/861.91; 73/861.92; 73/861.94
[58] Field of Search ........... 73/861.89, 861.78, 861.91, 73/861.92, 861.93, 861.94, 272 R, 861.83; 416/204 R, 223 R, DIG. 3

[56] References Cited

U.S. PATENT DOCUMENTS

| 3,301,053 | 1/1967 | Walch et al. | 73/861.78 |
| 3,979,957 | 9/1976 | Rutgerson et al. | 73/861.92 |
| 3,999,432 | 12/1976 | Coninx et al. | 73/861.91 |

FOREIGN PATENT DOCUMENTS

| 0834615 | 5/1967 | Canada . | |
| 0094352 | 11/1983 | European Pat. Off. . | |
| 0012766 | 1/1979 | Japan | 73/861.92 |

Primary Examiner—Stephen Chin
Assistant Examiner—T. May
Attorney, Agent, or Firm—Alton W. Payne

[57] ABSTRACT

A gas turbine meter that is miniaturized based on its design is disclosed. While the size of the gas turbine meter is small, it performs all the functions of prior gas turbine meters and has a large rangeability over a very large range of pressure. The turbine meter includes a body which is bilateral or symmetrical, permitting the turbine meter to be installed in either orientation in a flow line. Diffusers are included with the turbine meter that maintain the rotor of the turbine meter in position and prevent dust from entering into bearings which connect the rotor with the diffusers. The rotor of the turbine meter optimally has twelve flat vanes, each having blades angled at 45° from the plane of the blank in which it was made. Close clearance is maintained between the blades and the interior of the meter. Slots are formed at the lower end of the rotor, thereby forming the shanks of the vanes. The slots are optimally sized to increase stiffness. The magnetic strength of the magnetic pick-up which measures the rate of rotation of the vanes within the interior of the housing of the meter has a small gauss strength to avoid magnetic drag.

7 Claims, 7 Drawing Sheets

GAS TURBINE METER

FIELD OF THE INVENTION

The invention relates to flow measurement devices and in particular, to flow measurement devices using turbine meters as a basis of the flow measurement.

BACKGROUND OF THE INVENTION

Pipes are used to transport fluids of all sorts. Because the measurement of these fluids is important, various types of fluid measuring devices such as orifice plates, flow meters, turbine meters, etc. are installed in-line with pipe sections. The use of such a measurement for flow has been known since ancient times.

The present invention relates in general to turbine flow meters. Turbine flow meters usually include a measuring chamber having a flow guide in the front of such chamber, a measuring wheel supported for rotation in the chamber and includes a magnetic device which counts the blade turnings for blades mounted on the hub of the measuring wheel.

The basic theory with regard to electronic turbine meters is that fluid flow through the meter impinges upon the turbine blades which are free to rotate about an axis along the center line of the turbine housing. The angular (rotational) velocity of the turbine rotor is directly proportional to the fluid velocity through the turbine. The output of the turbine meter is measured by an electrical pickup mounted in the meter body. The output frequency of this electrical pickup is proportional to the flow rate. Also, each electrical pulse is proportional to a small incremental volume of flow. This incremental output is digital in form, and as such, can be totalized with a maximum error of one pulse regardless of the volume measured.

Problems with existing turbine meters include a shift in the meter factor (K) curve over pressure change, rangeability over a large range of pressures, large size, and the intrusion of dirt.

It is an object of the present invention to avoid the meter factor curve change over the operating pressure of the meter, to permit high flow rangeability over a large range of pressure, such as substantially ambient to 1500 p.s.i. It is a further object of the present invention to substantially reduce the size of the meter. An additional object of the present invention is to inhibit intrusion of dirt within the mechanism of the measuring wheels supported for rotation in the chamber.

SUMMARY OF THE INVENTION

The present invention discloses a turbine meter that is suitable for either liquid or gas flow which can be installed for use over a large pressure range, such as, for example, ambient to 1500 p.s.i. while maintaining a rangeability of, for example, 10:1 for ambient and 13:1 at 300 p.s.i. The present invention includes a body or housing in which is contained a bilateral or symmetrical configuration of a flow meter. The flow meter includes flow diffusers at each end located in the flow passage of the body and a detector at an interior wall of the body. A rotor is mounted on a rotor shaft between the two flow diffusers. The rotor optimally has twelve flat vanes with optimal blade angles of 45°. A close clearance is maintained between the vanes and the interior surface of the meter housing which is optimally between 0.008" and 0.012" inches. This is achieved through use of specific stiffness of the blade which stems from the use of a set of slots to form the blades having optimal size for oval slots of width to height ratio of 1.5 to 2.0, such as 0.169 by 0.094 for a two inch meter. The slots for most meters would be oval in shape but at the extreme small and large sizes may be other shapes, such as tear drop. A magnetic pick-up is located in the housing immediately juxtaposed with the blades and separated from the blade by the interior wall of the body and the small clearance discussed above. The magnetic strength of such magnet located in the interior wall of the body is between 50 and 200 gauss for a two inch turbine meter of the present invention as described above. The rotor is mounted on the rotor shaft by bearings which are precision ball bearings for optimal results. Blade thickness may vary between 0.01 to 0.025 percent of the rotor diameter, such as 0.020 inches and 0.050 inches for a two inch meter while maintaining the small size of the turbine meter.

BRIEF DESCRIPTION OF THE DRAWING

For a further understanding of the nature and objects of the present invention, reference is made to the following drawing in which like parts are given like reference numbers and wherein.

DESCRIPTION OF THE EMBODIMENTS

Figure 1:
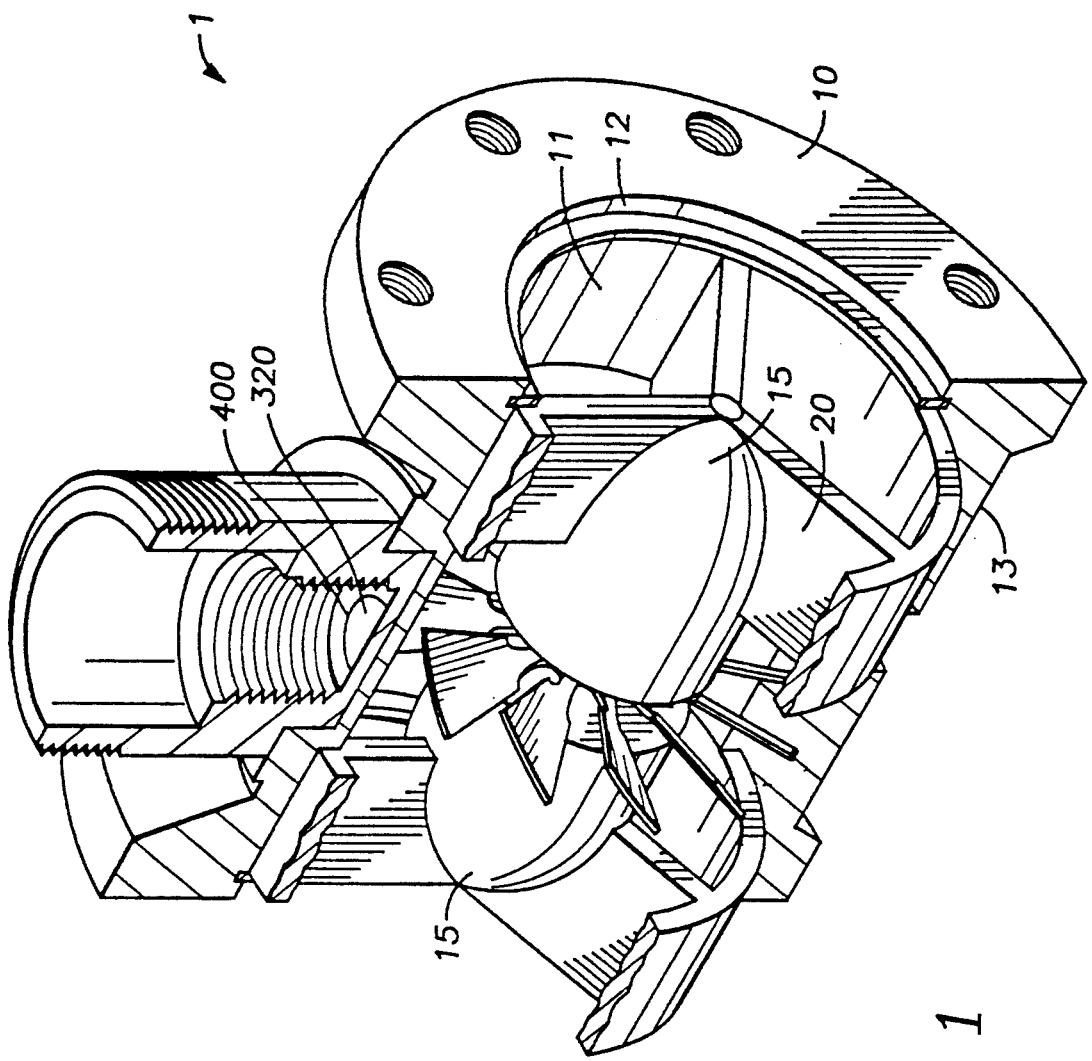
FIG. 1 is a perspective view of the preferred embodiment of the present invention of the turbine meter.
Figure 9:
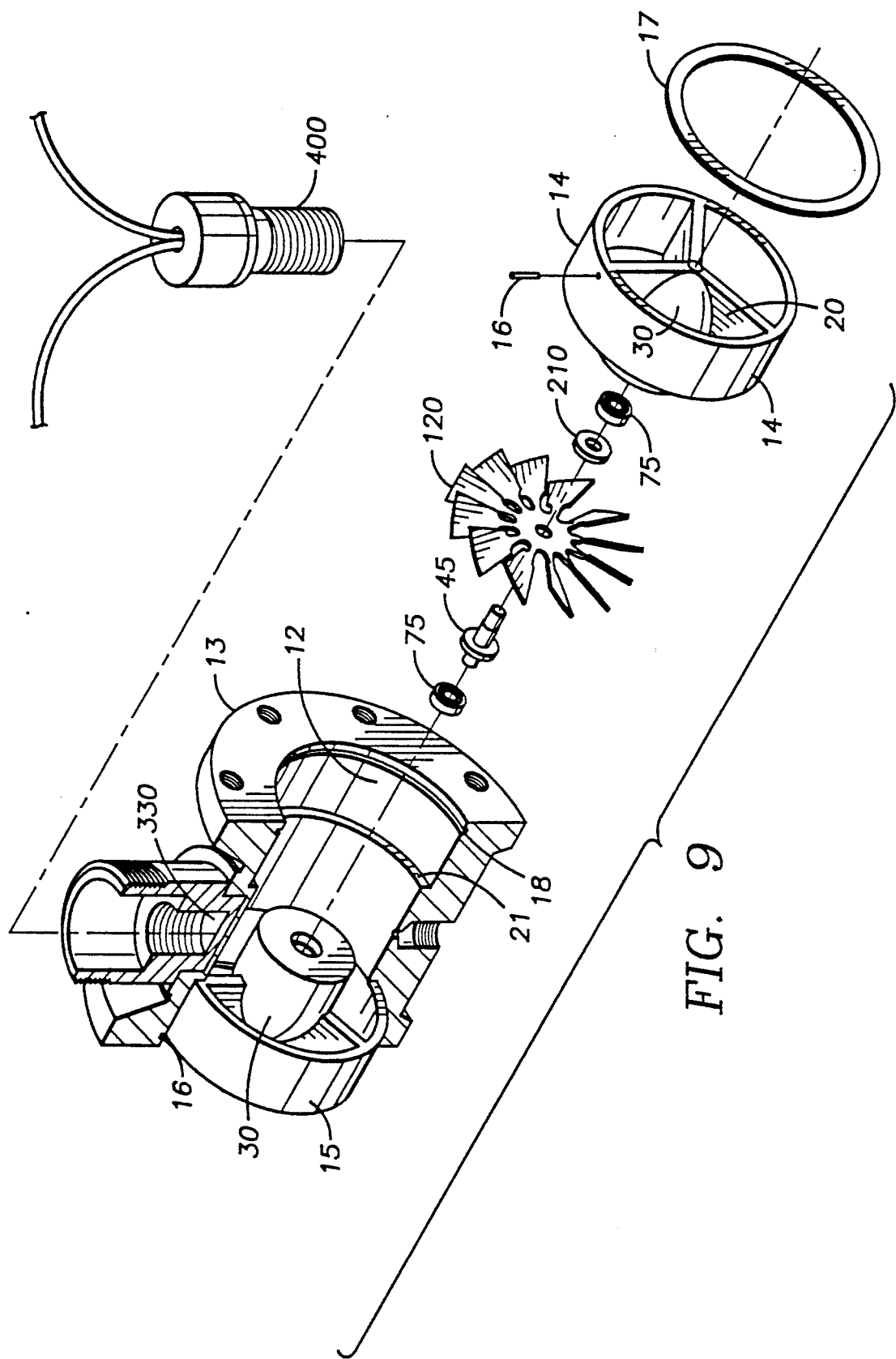
FIG. 9 is an exploded view of the alternate embodiment of the turbine meter of the present invention.

A turbine meter 1 is shown in FIG. 1 having sealing faces 10 for appropriate mounting in line. Turbine meter 1 further includes interior passage 11 surrounded by interior wall 12 of housing 13. Substantially identical diffusers 15 (FIG. 9) are mounted in passage 11 by spacers 20 which extend from diffusers 15 to an interior hub 14 sized to fit in interior wall 12 of housing 13. In this manner, as shown in FIG. 9, turbine meter 1 is symmetrical and can be installed with either end facing the upstream. Locator pins 16 hold hubs 14 onto the interior wall 12. Retainer rings 17 engage grooves 18 in wall 12 to lock hubs 14 in place. Hubs 14 abut interior shoulders 21 formed in wall 12.

Figure 2:
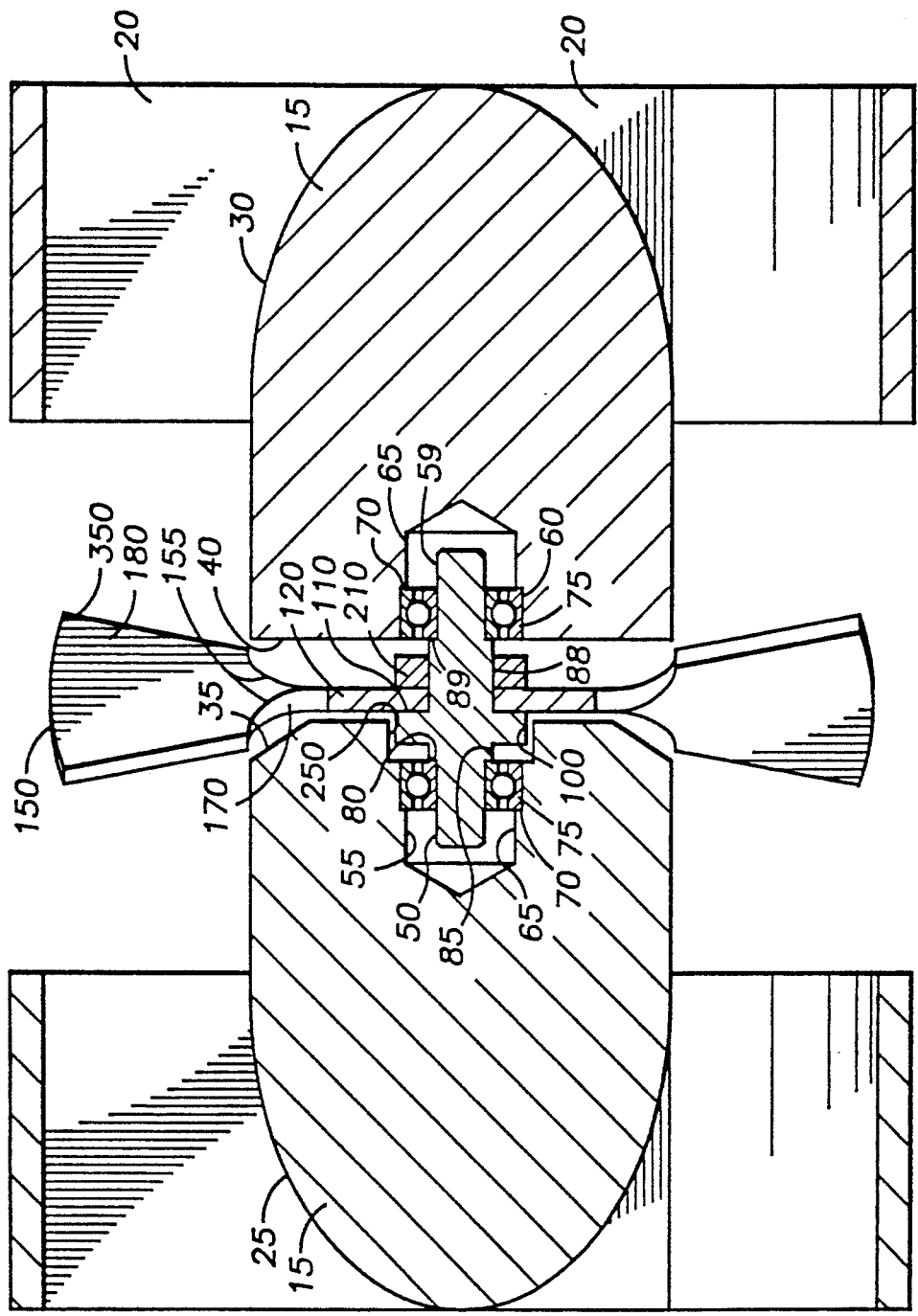
FIG. 2 is a side, partial cross-sectional view of the preferred and alternate embodiment of the present invention of the turbine meter.
Figure 10:
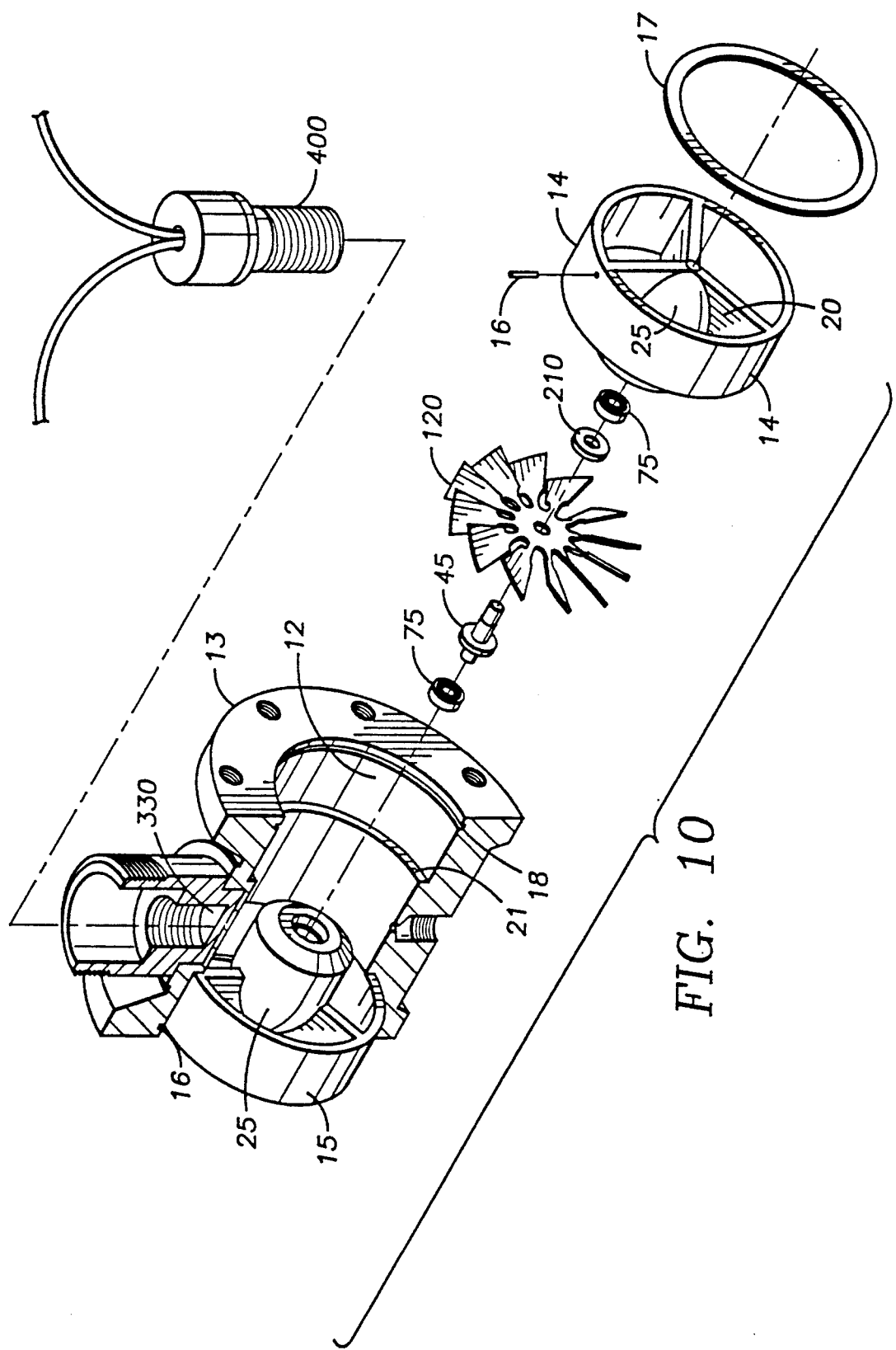
FIG. 10 is an exploded view of the preferred embodiment of the turbine meter of the present invention.

Referring to FIGS. 2, 9 and 10, the diffusers 15 are shown in two different configurations for contrast only.

The alternate configuration of diffuser 15 is designated by indicator 30 (see FIG. 9), and the diffuser of the current design which is preferred is indicated by indicator 25 (see FIG. 10). The difference between the diffuser types is in the back edge 35, 40 of the diffusers 25, 30, respectively. The back edge 35 of diffuser 25 extends inwardly much farther than the back edge 40 of diffuser 30.

As shown in FIG. 2, rotor shaft 45 is located such that its longitudinal axis is substantially identical with the longitudinal axis of the diffusers 15. The ends 50, 59 of rotor shaft 45 extend into central bores 55 of diffusers 15. Bores 55 have a smaller diameter inner recess 65 coaxial to an adjacent larger diameter cavity 60 forming a shoulder 70 therebetween.

Rotor shaft 45 is positioned to be substantially coaxial with central diffuser bores 55 by bearings 75 mounted in the cavity 60 and interiorly abutting shoulder 70.

Rotor shaft 45 is shaped to include shoulders 80, 89. Shoulder 80 is formed between smaller diameter arm 50 and raised member 85. Shoulder 89 is formed between smaller diameter arm 59 and raised member 88. Rotor hub or shaft 45 also includes a central larger diameter body 100, one radial surface 105 of which faces raised member 85, and the other radial surface 110 faces raised member 88. The bearing 75 also abuts shoulder 80 on the side of surface 105, and a second bearing 75 abuts shoulder 89 on the side of surface 110, thereby centering arms 50, 59 of rotor shaft 45 in diffuser bores 55. Because of bearings 75, rotor shaft 45 is rotatably mounted within diffuser bores 55. Bearings 75 are preferably precision ball bearings, instead of other bearings such as jewel bearings. Precision ball bearings increase life at high speeds and because of the remainder of the features of the preferred embodiment of the present invention, may be used at low flow rates instead of jewel bearings. Jewel bearings and shaft assembly operating at high revolutions per minute do not last very long.

The rotor 120 comprises a single central aperture 130, a planar radial surface adjacent the aperture 130 and a plurality of radially spaced vanes formed by a plurality of slits extending inward from the disk circumference. The slits include terminal elongated slots 140 having a larger width to bifurcate the vane into an inclined blade portion 180 and a shank portion 170 integral with the disk planar surface. Rotor 120 is slidably mounted on raised shaft portion 88 by sliding the shaft arm 59 and raised member 80 through the aperture 130 so that the rotor planar surface abuts the surface 110 of the large diameter shaft body 100.

Before the vanes are unitarily formed in rotor 120, a plurality of radially spaced slits 140 are formed in a rotor 120 blank comprising a circular piece of magnetizable metal. The slits extend from the circumference and terminate in the elongated slots 140 having a larger width. The slots 140 for most meters would be oval in shape but at the extreme small and large sizes may be other shapes, such as tear drop. For oval slots, the width to height ratio would be preferably 1.5 to 2.0. Typically for a two inch meter the dimensions would be 0.169 by 0.094 inches. The slots 140 are located symmetrically about the center of rotor 120 and radially displaced from the center of rotor 120 by at least twenty-five percent of the radius of the rotor 120. The interior end 160 and the opposing exterior end 155 of slots 140 have a radius of curvature of, for example 0.047 inches for a two inch meter, and the outer end 155 of each of the slots 140 includes a narrow channel 145, having a width less than or equal to the material thickness of the blades, for example, 0.025 inches for a two inch meter, extending to the outer circumference 150 of rotor 120. Typically, these slots 140 extend above the interior end curved portion 160, approximately starting at 0.315 inches from the center (for a two inch turbine meter) of aperture 130 and end at the beginning of the exterior end curved portion 155 which typically starts 0.484 inches from the center (for a two inch turbine meter) of aperture 130. The material between slots 140 forms the shank 170 leading to flat blade portions 180 that extend from the exterior curved surface of the exterior end 155 to the outer circumference 150 of rotor 120. With regard to the thickness of the flat blade portions 180, blade thickness is preferably in the range of 1 to 2.5 percent of the rotor diameter, such as 0.020 inches to 0.050 inches for a two inch meter. Shank 170 permits the flexibility to twist the blade portion 180 relative to the interior of rotor 120.

The disk blanks for the rotor 120 are not preferably formed by a stamping die. The edges 350 of the flat blade portions 180 are important to the performance of the turbine meter rotor 120 and must be sharp. Sharp edges 350 are needed for liquid as well as gas meters. Accordingly, with a single stage stamping die, care cannot be taken as to what type of edge 350 can be provided, and whether the edges 350 may have to be machined or have additional stamping die stages to be sharp. For rotor 120 blank fabrication, milling or laser cutting will be preferably used for sharpness of leading and trailing edges 350 which effect linearity.

The openings or slots 140 affect the stiffness of the flat blade portion 180. Stiffness is important in a turbine meter to minimize clearances and thus lower weight and size and cost of substantially all components while maintaining accuracy. The preferred notch 140 size ratio for an oval slot is, as set out above, preferably 1.5 to 2.0, for example, 0.169 inches by 0.094 inches for a two inch turbine meter. In addition, because of the extra stiffness, the number of vanes may be increased. The flat blade portions 180 may retain the stiffness because of slots 140 while increasing the number of vanes, such as above six vanes, such as a range between six to and including twelve vanes with the optimal being twelve vanes. The larger number of vanes in combination with blade angle gives a greater resolution or frequency to the signal produced by the turbine meter.

The angle of flat blade portions 180 is turned in a range between 30° and 60° with respect to the longitudinal axis of the flow path, with an optimal angle of 45°. The angle determines to some extent the speed of the turning of the rotor, which as the angle increases, the speed increases. Slower turning decreases resolution. However, speed decreases bearing life, and speed must be chosen to optimize bearing life and resolution. The use of a 45° angle yields the frequency which typically for a meter of the preferred embodiment is 3000 hertz which is believed to be significantly higher than meters of the prior art. The 45° angle requires the extra stiffness in order to be functional at maximum speeds. In addition, lower angles are much less responsive at low flows, and thus cut the rangeability of the meter at low flow rates and low pressures.

Because of the stiffness, the length of the flat blade portions 180 may be increased, thereby reducing the clearance between the outer surface 150 of blade 180 and the interior surface 360 of portion 320 of interior wall 12. Such clearance in the preferred embodiment is in a range between 0.008 and 0.012 inches. The smaller this distance is; the closer the flat blade portions 180 come to the pick-up coil 400 to obtain accurate readings because at high pressures the thickness of portion 320 must be sufficient to withstand the high pressure in the interior opening 11 of the body or housing 13. Further, the weight of the flat blade portions 180 is important so that at low end flow rates, magnetic drag is not experienced as greatly. In addition, at the high end of the pressure range, flexing of the blades 180 can cause collision with the interior surface 360 or alternately may open the gap to surface 360 thereby decreasing signal strength. However, because at the low end of the pressure range magnetic drag is a factor, increasing weight is not the solution to the stiffening, but the optimizing of the slot 140 is required as discussed above.

Because of the size of the slot 140, the thickness of the flat blade portions 180, and the support of the large diameter shaft body 100, a large free diameter of the flat blade portions 180 may be used, such as preferably a diameter of five times the diameter of the shaft body 100. This causes significant weight saving.

Rotor 120 is attached to the large diameter shaft body 100 by small welds 200 or with special bonding agents such that the planar surface of one side of rotor 120 securely abuts the rotor shaft 45 at the radial surface 110 of the large diameter shaft body 100. A lock washer 210 having an outer diameter, radial surface and a central aperture receiving the shaft arm 59, abuts the rotor 120 at the rotor planar surface from the opposite side of the shaft body 100 and is fastened to rotor 120 by a small weld 230 or with special bonding agents to immobilize the rotor 120 on the shaft. Thus, lock washer 210 and rotor 120 are rotatably mounted about the center axis of opening 55. Preferably resistance welding would be used in manufacture instead of spot welds. The welding 200, 230 of the rotor 120 shaft assembly also improve the attachment of the rotor 120. The welds 200, 230 eliminates potential problems with other type of bonding agents, such as Loctite TM, although Loctite TM may be used as a bonding agent. The problems of other type of bonding agents would include improper assembly procedures and part cleaning which are necessary for a bonding of this type to perform the appropriate tasks. The welds 200, 230 or other welding techniques, unlike other techniques, can be visually inspected to determine acceptability, whereas incorrect procedures of assembly and bonding cannot be detected until the equipment falls apart. Because the meter 1 may be used in bi-directional flow, the welds 200, 230 also become important because thrust forces on the rotor 120 are transmitted to the lock washer 210 in the reverse flow mode. Further, a welded rotor 120 may increase the maximum temperature limit of the meter 1. Care should be taken to insure that the planar surface of rotor 120 abuts the radial surface 110 of the shaft body 100.

Figure 3:
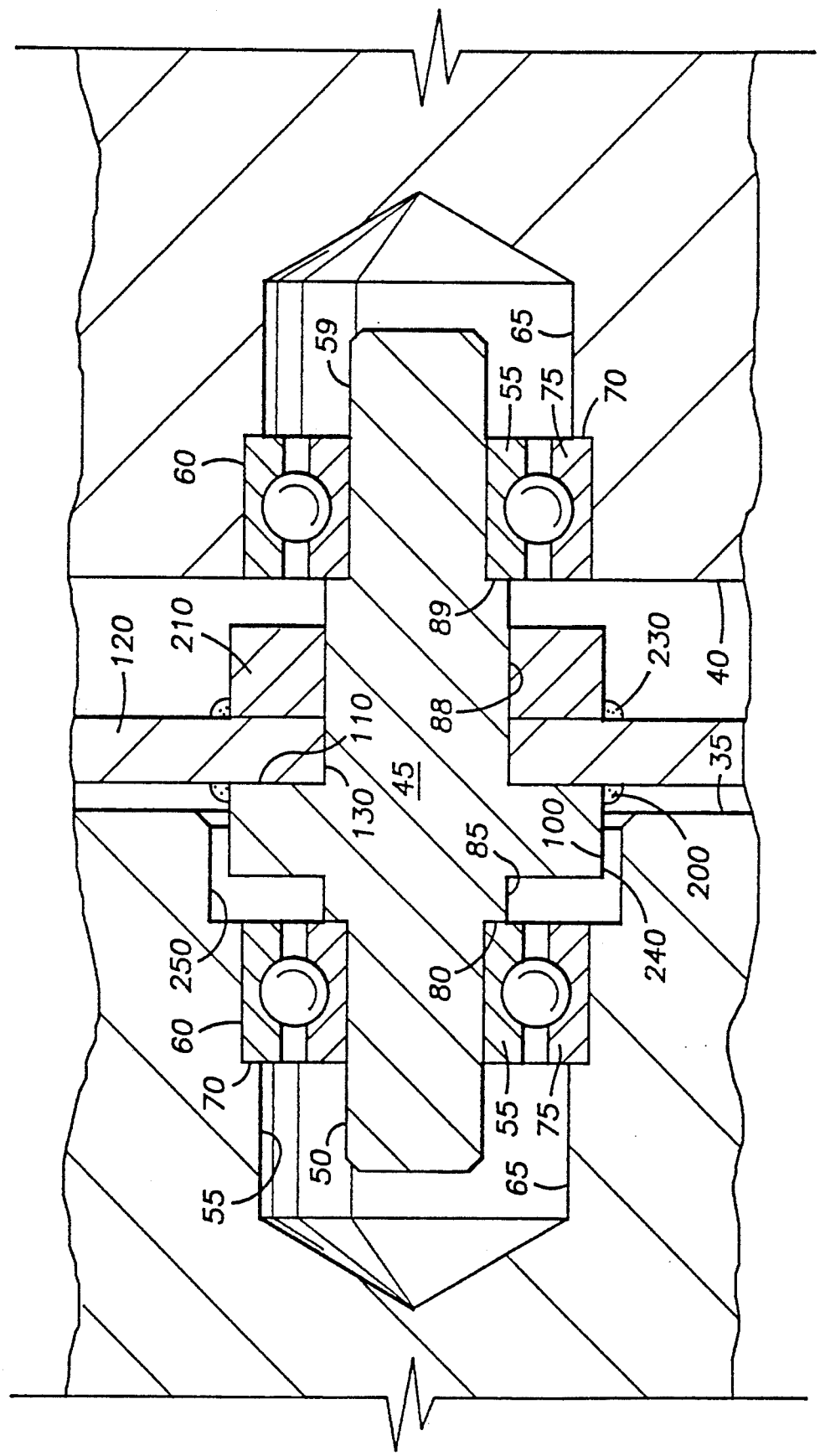
FIG. 3 is a partial side cross-sectional view of a portion of the preferred and alternate embodiment of FIG. 2.
Figure 4:
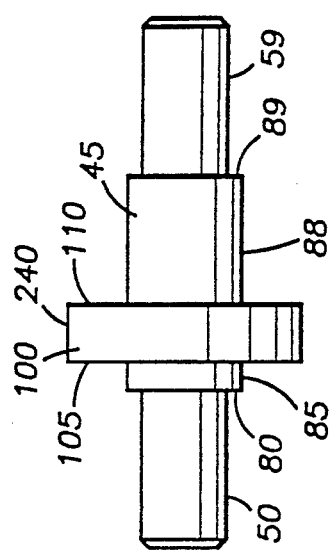
FIG. 4 is a plan view of the rotor shaft of the preferred embodiment of the present invention of the turbine meter.
Figure 7:
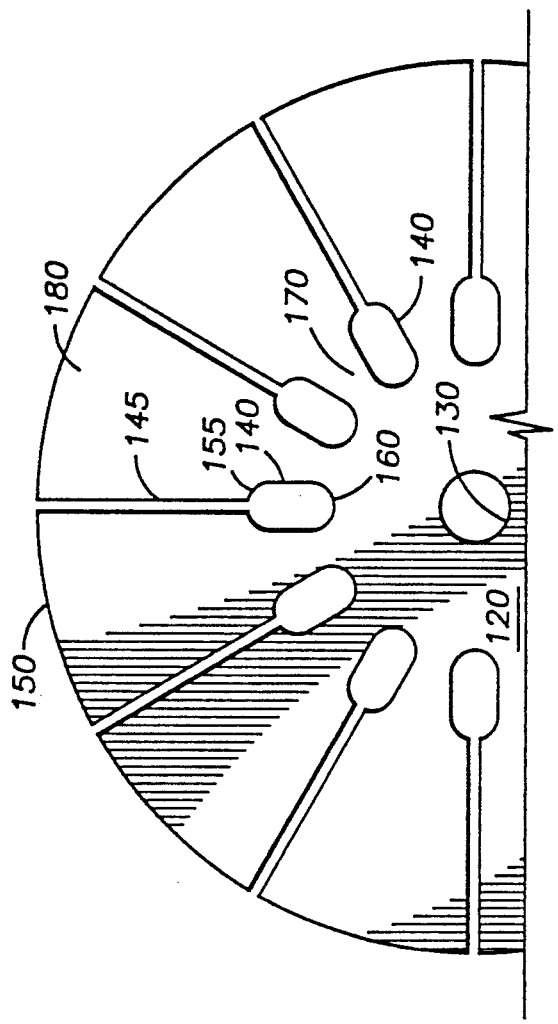
FIG. 7 is an enlarged view of the portion of FIG. 6 labelled "A"
Figure 6:
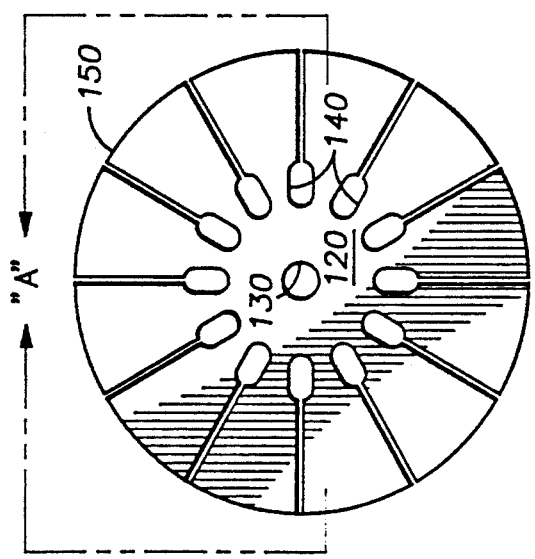
FIG. 6 is a plan view of the rotor of the preferred embodiment of the present invention of the turbine meter prior to the formation of the vane configuration.
Figure 8:
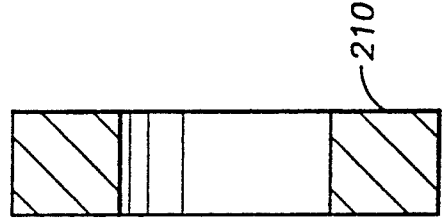
FIG. 8 is a side view of the rotor shaft lock washer of the preferred embodiment of the present invention of the turbine meter.
Figure 5:
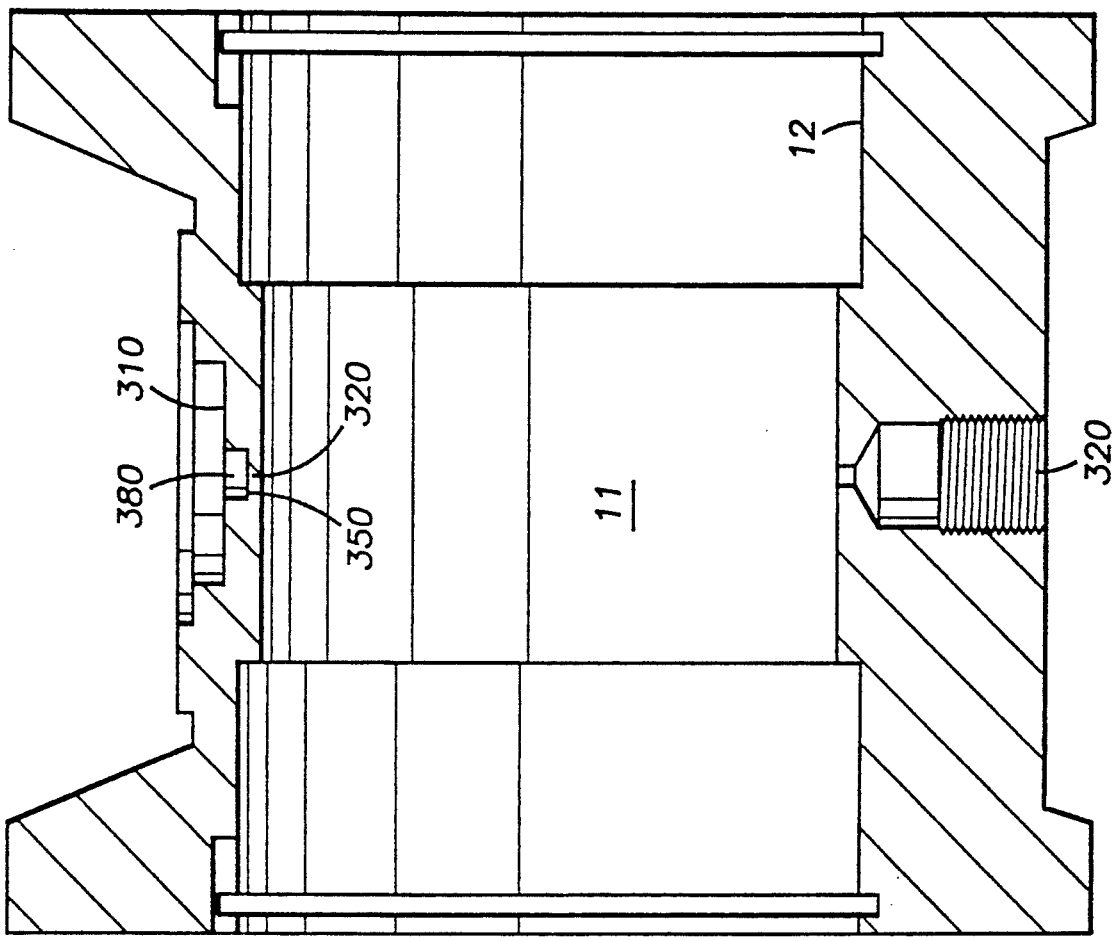
FIG. 5 is a cross-sectional view of the housing of the preferred embodiment of the present invention of the turbine meter.

As shown in FIGS. 2 and 3, the preferred diffuser 25 includes interior surface 35 which extend substantially over an outer diameter 240 of the large diameter shaft body 100. Optionally, as shown in FIGS. 2-3, the bore 55 of the diffuser 25 has a large diameter outer opening 250 receiving the large diameter shaft body 100. The clearance between outer diameter 240 of the shaft body 100 and the diameter of the bore outer opening 250 is very close. Thus, debris in the fluid stream would tend not to leak into the bearing 75 area of the mounting of the rotor 120 and rotor shaft 45 with the preferred diffusers 25. In addition, these surfaces will tend to capture the rotor 120 should the bearings fail, preventing damage to the interior 11 of body or housing 13. While not shown in FIG. 3, if a diffuser type 25 is used on both sides in place of diffuser type 30 (shown on one side of FIG. 2), the large diameter outer opening 250 of the diffuser central bore 55 receives the lock washer 210 to substantially cover the lock washer outer diameter and inhibit access of debris in the stream to the bearing 75.

Accordingly, the diffuser modification will hold the rotor 120 in place longer after failure of the bearings 75, giving some indication of flow for a longer period of time and preventing the rotor 120 from damaging the bore or interior wall 12 of housing 13 and, especially the thin wall 320 under the coil 400.

The housing 13 includes a pressure tap 300 centrally located for which a pressure transducer and transmitter may be attached to measure the pressure in the interior 11 close to the flat blade portions 180.

The housing 13 further includes an indented exterior portion 310 that houses the pick-up coil 400 graphically depicted in FIG. 1 and shown in FIGS. 9 and 10 which, except as described below, is standard in the art. The pick-up coil 400 includes coils typical of the art which are wound and placed within opening 330. In the preferred embodiment of the present invention, because the blades are so close to the interior wall 360 of the housing 13, and there are so many flat blade portions 180, magnetic strength of the pick-up coil 400 should be optimized to improve meter performance at low flow rates and avoid magnetic drag. The magnetic strength of the pick-up coil 400 is preferably between 50 and 200 gauss for an exemplary two inch turbine meter of the present invention measuring fluid flow over a pressure range from ambient to 1500 psi and having a rotor design as described above (e.g. twelve vanes, blades having a 45 degree angle, oval slots having a 0.169 inch height and 0.094 inch width, slots centered at a circle of radius equal to 0.400 inches, etc.). The magnetic force is a function of the number of windings and the wire size of the pick-up coil 400. The thickness 320 below the opening 330 for the pick-up coil 400 must be sufficient to contain the pressure within the interior 11 of the housing 13.

In use, after assembly, flow may be introduced on either diffuser 25 or 30 of meter 1 which will deflect the flow against the surface of flat blade portions 180 facing the flow. The impinging flow causes the vanes to rotate around the axis of rotor shaft 45. As the flat blade portions 180 rotate under the pick-up coil 400 located over surface 320, the presence of the flat blade portions 180 of the rotor 120 will be detected as pulses having a width dependant on the time that surface 150 is juxtaposed in whole or in part with pick-up coil 400. The pulses are subject to signal smoothing and shaping and amplification and other conditioning by preamplification and ultimately used for flow rate and/or flow volume measurement.

The shift on the meter curve as a function of line pressure is dependent on the ratio of the total drag on the rotor to the turning moment on the rotor. Major contributors to the drag are mechanical, frictional, viscous, and magnetic. At the same flow rate with the increasing density of the fluid, the turning moment also increases. For a meter with a mechanical drive, the main source of drag is from the drive. Therefore, a shift of the meter curve occurs at a higher line pressure. With magnetic pick-up, the drag is significantly reduced-Hence, the shift on the meter curve occurs at a much lower line pressure than that of a turbine meter with mechanical drive. For the miniature turbine meter 1 a significant contribution of drag is from the magnetic field of the pick-up coil. The combination of magnetic pick-up coil strength, choice of bearing, blade thickness, blade angle, and blade clearance has a synergistic effect to minimize the shift of the meter curve to line pressures as low as ambient condition. The curve shift is insignificant and included within the accuracy of the meter.

The embodiments set forth herein are merely illustrative and do not limit the scope of the invention or the details therein. For example, sizing will cause adjustments in various dimensions. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be more in the embodiments herein detailed in accordance with the descriptive requirements of the law, it is to be understood that the details herein are to be interpreted as illustrative and not in a limiting sense.

What is claimed as invention is:

1. A gas turbine meter for metering a stream comprising:
   (a) a housing having an interior passage, an interior surface, and first and second opposing entrances to the passage;
   (b) a first flow diffuser disposed in the first entrance and a second flow diffuser disposed in the second entrance, said first and second diffusers each having a bearing disposed in a central diffuser bore, each the diffuser bore comprising an inner recess and an adjacent larger diameter outer cavity forming a shoulder for interiorly abutting the bearing, the bore of said second diffuser including a larger diameter outer opening adjacent the cavity;
   (c) a rotor shaft comprising a central body, opposing smaller diameter members depending from the central body forming a first shoulder having a first radial surface, and opposing smaller diameter arms depending from the members and received in the bearings, the arms forming a second shoulder having a second radial surface for exteriorly abutting the bearings, wherein the central body is received in the larger diameter outer opening of the second diffuser bore for shielding the bearing in the second diffuser bore from debris in a stream;
   (d) a rotor unitarily formed from a magnetizable metallic disk, said rotor comprising a central aperture, an adjacent planar radial surface, and a plurality of radially spaced vanes formed by a plurality of radially spaced slits extending inward from the disk circumference, the slits including terminal elongated slots having a larger width to bifurcate the vane into an inclined blade portion and a shank portion integral with the rotor planar surface, the central aperture receiving a member of the shaft, the rotor planar radial surface affixedly abutting the first radial surface; and
   (e) a magnetic pick-up mounted in said housing for detecting the revolutions of said rotor.

2. The turbine meter defined in claim 1, including a lock washer having a central aperture and a radial surface, said washer aperture receiving a member of said shaft so that the washer surface interiorly abuts said rotor opposite the first radial surface for immobilizing said rotor on said rotor shaft.

3. The turbine meter defined in claim 2, wherein said central bore of said first diffuser has a larger diameter outer opening adjacent the cavity for interiorly receiving said washer therein for shielding the bearing in the first diffuser bore from debris in the stream.

4. The turbine meter defined in claim 1, wherein the thickness of the blades is from about 1 to about 2.5 percent of the rotor diameter.

5. The turbine meter defined in claim 4, wherein the rotor slots are formed along a circle having a radius of at least 0.25 times the radius of said rotor.

6. The turbine meter defined in claim 5, wherein a clearance between the vanes and the housing inner surface is between about 0.008 inches and about 0.012 inches.

7. The turbine meter defined in claim 6, wherein the bearings comprise precision ball bearings.

* * * * *